United States Patent [19]

Impink, Jr.

[11] 4,432,930
[45] Feb. 21, 1984

[54] SPECTRAL SHIFT REACTOR CONTROL METHOD

[75] Inventor: Albert J. Impink, Jr., Murrysville Boro, Pa.

[73] Assignee: Westinghouse Electric Corp., Pittsburgh, Pa.

[21] Appl. No.: 217,054

[22] Filed: Dec. 16, 1980

[51] Int. Cl.³ .............................................. G21C 7/00
[52] U.S. Cl. ................................... 376/215; 376/217; 376/236; 376/244
[58] Field of Search ............... 376/244, 236, 237, 241, 376/215–217, 207

[56] References Cited

U.S. PATENT DOCUMENTS

| | | | |
|---|---|---|---|
| 3,565,760 | 2/1971 | Parkos et al. | 376/217 |
| 4,069,097 | 1/1978 | Frank | 376/217 |
| 4,236,220 | 11/1980 | Koganai et al. | 376/217 |
| 4,240,874 | 12/1980 | Millot . | |
| 4,299,657 | 11/1981 | Abenhaim et al. | 376/217 |

FOREIGN PATENT DOCUMENTS 54-39795  3/1979  Japan ................................ 376/217

OTHER PUBLICATIONS

Nuclear Technology, vol. 48, 4/80, pp. 91–100, Hayase et al.

Primary Examiner—Harvey E. Behrend
Attorney, Agent, or Firm—L. A. DePaul; Z. L. Dermer

[57] ABSTRACT

A method of operating a pressurized water nuclear reactor comprising determining the present core power and reactivity levels and predicting the change in such levels due to displacer rod movements. Groups or single clusters of displacer rods can be inserted or withdrawn based on the predicted core power and reactivity levels to change the core power level and power distribution thereby providing load follow capability, without changing control rod positions or coolant boron concentrations.

6 Claims, 13 Drawing Figures

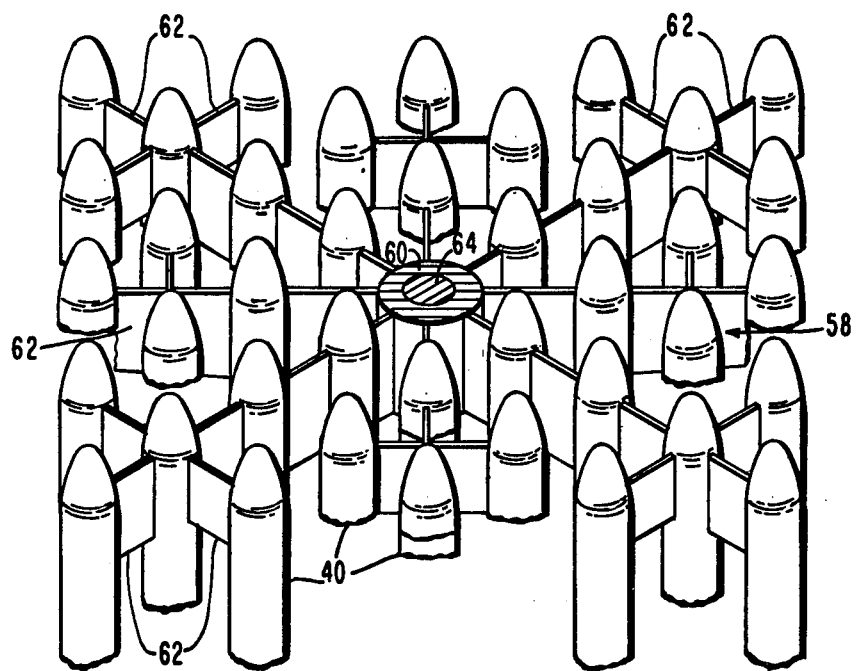
FIG. 4
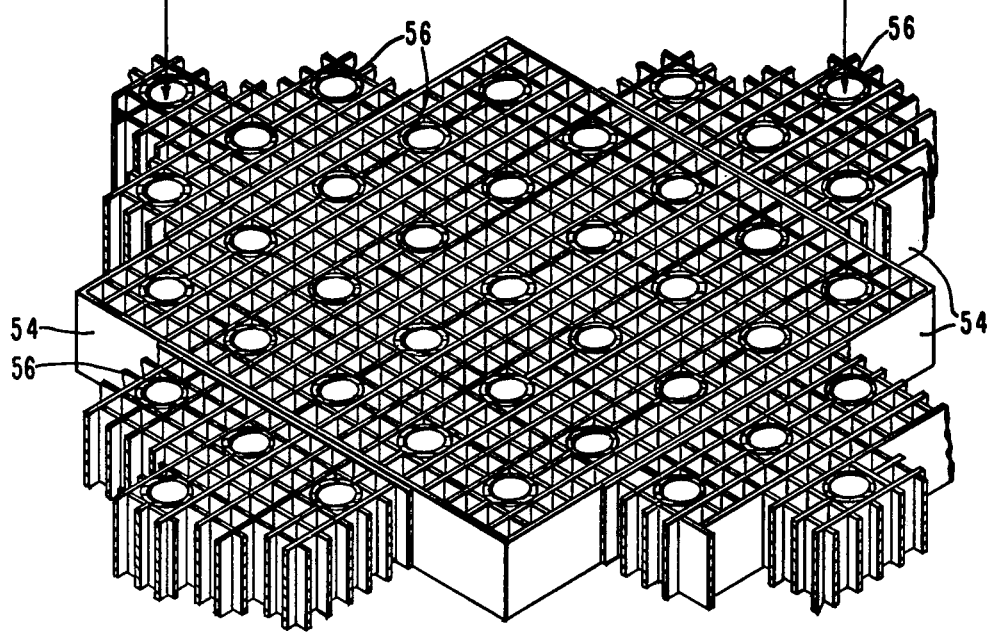

SPECTRAL SHIFT REACTOR CONTROL METHOD

CROSS-REFERENCES TO RELATED APPLICATIONS

This application is related to copending applications Ser. No. 217,060 entitled "Mechanical Spectral Shift Reactor" by W. J. Dollard et al.; Ser. No. 217,056 entitled "Latching Mechanism" by L. Veronesi; Ser. No. 217,061 entitled "Spectral Shift Reactor" by W. R. Carlson et al.; Ser. No. 217,052 entitled "Displacer Rod For Use In A Mechanical Spectral Shift Reactor" by R. K. Gjertsen et al.; Ser. No. 217,053 entitled "Mechanical Spectral Shift Reactor" by D. G. Sherwood et al.; Ser. No. 217,275 entitled "Mechanical Spectral Shift Reactor" by J. F. Wilson et al.; Ser. No. 217,055 entitled "Hydraulic Drive Mechanism" by L. Veronesi et al.; Ser. No. 217,059 entitled "Fuel Assembly For A Nuclear Reactor" by R. K. Gjertsen; and Ser. No. 217,051 entitled "Fuel Assembly For A Nuclear Reactor" by R. K. Gjertsen et al. all of which are filed Dec. 16, 1980 and to Ser. No. 228,007 entitled "Self-Rupturing Gas Moderator Rod For A Nuclear Reactor" by G. R. Marlatt, filed Jan. 23, 1981 all of which are assigned to the Westinghouse Electric Corporation.

BACKGROUND OF THE INVENTION

The invention relates to spectral shift reactor control and more particularly to mechanical means for spectral shift rector control.

In typical nuclear reactors, reactivity control is accomplished by varying the amount of neutron absorbing material (poisons) in the reactor core. Generally, neutron absorbing control rods are utilized to perform this function by varying the number and location of the control rods with respect to the reactor core. In addition to control rods, burnable poisons and poisons dissolved in the reactor coolant can be used to control reactivity.

In the conventional designs of pressurized water reactors, an excessive amount of reactivity is designed into the reactor core at start-up so that as the reactivity is depleted over the life of the core the excess reactivity may be employed to lengthen the core life. Since an excessive amount of reactivity is designed into the reactor core at the beginning of core life, neutron absorbing material such as soluble boron must be placed in the core at that time in order to properly control the excess reactivity. Over the core life, as reactivity is consumed, the neutron absorbing material is gradually removed from the reactor core so that the original excess reactivity may be used. While this arrangement provides one means of controlling a nuclear reactor over an extended core life, the neutron absorbing material used during core life absorbs neutrons and removes reactivity from the reactor core that could otherwise be used in a more productive manner such as in plutonium fuel production. The consumption of reactivity in this manner without producing a useful product results in a less efficient depletion of uranium and greater fuel costs than could otherwise be achieved. Therefore, it would be advantageous to be able to extend the life of the reactor core without suppressing excess reactivity with neutron absorbing material thereby providing an extended core life with a significantly lower fuel cost.

One such method of producing an extended core life while reducing the amount of neutron absorbing material in the reactor core is by the use of "Spectral Shift Control". As is well understood in the art, in one such method the reduction of excess reactivity (and thus neutron absorbing material) is achieved by replacing a large portion of the ordinary reactor coolant water with heavy water. This retards the chain reaction by shifting the neutron spectrum to higher energies and permits the reactor to operate at full power with reduced neutron absorbing material. This shift in the neutron spectrum to a "hardened" spectrum also causes more of the $U^{238}$ to be converted to plutonium that is eventually used to produce heat. Thus, the shift from a "soft" to a "hard" spectrum results in more neutrons neutrons being consumed by $U^{238}$ in a useful manner rather than by poisons. As reactivity is consumed, the heavy water is gradually replaced with ordinary water so that the reactor core reactivity is maintained at a proper level. By the end of core life, essentially all the heavy water has been replaced by ordinary water while the core reactivity has been maintained. Thus, the reactor can be controlled without the use of neutron absorbing material and without the use of excess reactivity at start-up which results in a significant uranium fuel cost savings. The additional plutonium production also reduces the $U^{235}$ enrichment requirements. While the use of heavy water as a substitute for ordinary water can be used to effect the "spectral shift", the use of heavy water can be an expensive and complicated technology.

Another well known phenomenon related to reactor control is referred to as xenon transient behavior. Xenon-135 is a fission product of uranium fuel some of which is a direct fission product of uranium-235 but most of which originates from the radioactive decay of tellurium-135 and iodine-135 which are produced from the fissioning of uranium-235. The major portion of the xenon thus produced is produced in a delayed manner due to the intermediate isotope production. This results in a time delay of several hours between the fissioning of fissile or fertile material and the production of large quantities of xenon-135. On the other side of the xenon transient phenomenon is the fact that since xenon-135 has a large neutron absorbing cross-section, xenon-135 tends to absorb neutrons and be destroyed thereby. Thus, xenon acts as a neutron poison in a reactor core robbing the core of neutrons that could be used to sustain the chain reaction. The transient usually associated with the xenon phenomenon arises because as power is reduced due to load follow reason, neutron population in the core decreases which results in less destruction of xenon and in temporary xenon accumulation. This temporary accumulation of xenon further reduces reactor power by xenon absorption of neutrons. However, the reduction in reactor power lowers the core temperature which increases core reactivity due to the negative moderator temperature coeffecient of the reactor. Thus, a minor oscillation in reactor power, xenon population, and core temperature can result from transient xenon production. Likewise, a similar result may occur from an attempt to increase reactor power in response to load follow requirements. This may occur since an increase in reactor power requires an increase in neutron population and fuel depletion which increases xenon production in the fuel. But since the xenon production is delayed in time, the poisonous effect of the xenon is temporarily delayed which again produces the transient oscillations between core temperature, xenon population, and reactor power. As is well understood in the art, the effects of these xenon transients can be effectively controlled by the addition or subtraction of boron in the reactor coolant by a feed-and-bleed process. The change in boron concentration in the reactor coolant can be timed to correspond to the changes in core reactivity due to the xenon transient thereby negating such transient. This can be accomplished as long as the boron concentration in the reactor coolant is sufficiently high to make a feed-and-bleed process possible in a timely manner. However, when the boron concentration falls below a given level, for example below 100 ppm. as is necessary near the end of core life, boron cannot be removed from the reactor coolant fast enough to compensate for xenon accumulation. Therefore, as the boron concentration in the reactor coolant nears a low level such as at the end of core life, boron compensation of xenon becomes very difficult which effectively prevents load follow maneuvering of reactor power so as to avoid xenon transients.

Therefore, what is needed is a method to extend core life and provide for load follow capabilities at low reactor coolant boron concentrations.

SUMMARY OF THE INVENTION

A method of operating a pressurized water nuclear reactor comprising determining the present core power and reactivity levels and predicting the change in such levels due to displacer rod movements. Groups or single clusters of displacer rods can be inserted or withdrawn based on the predicted core power and reactivity levels to change the core power level and power distribution thereby providing load follow capability, without changing control rod positions or coolant boron concentrations.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawings, wherein:

FIG. 4 is a view in perspective of displacer rods and their respective fuel assembly;

DESCRIPTION OF THE PREFERRED EMBODIMENT

In the operation of a commercial pressurized water reactor it is desirable to be able to prolong the life of the reactor core to better utilize the uranium fuel and to be able to effectively change the reactor core power output in response to load follow requirements. The invention described herein provides a means to control a spectral shift reactor during load follow.

Figure 1:
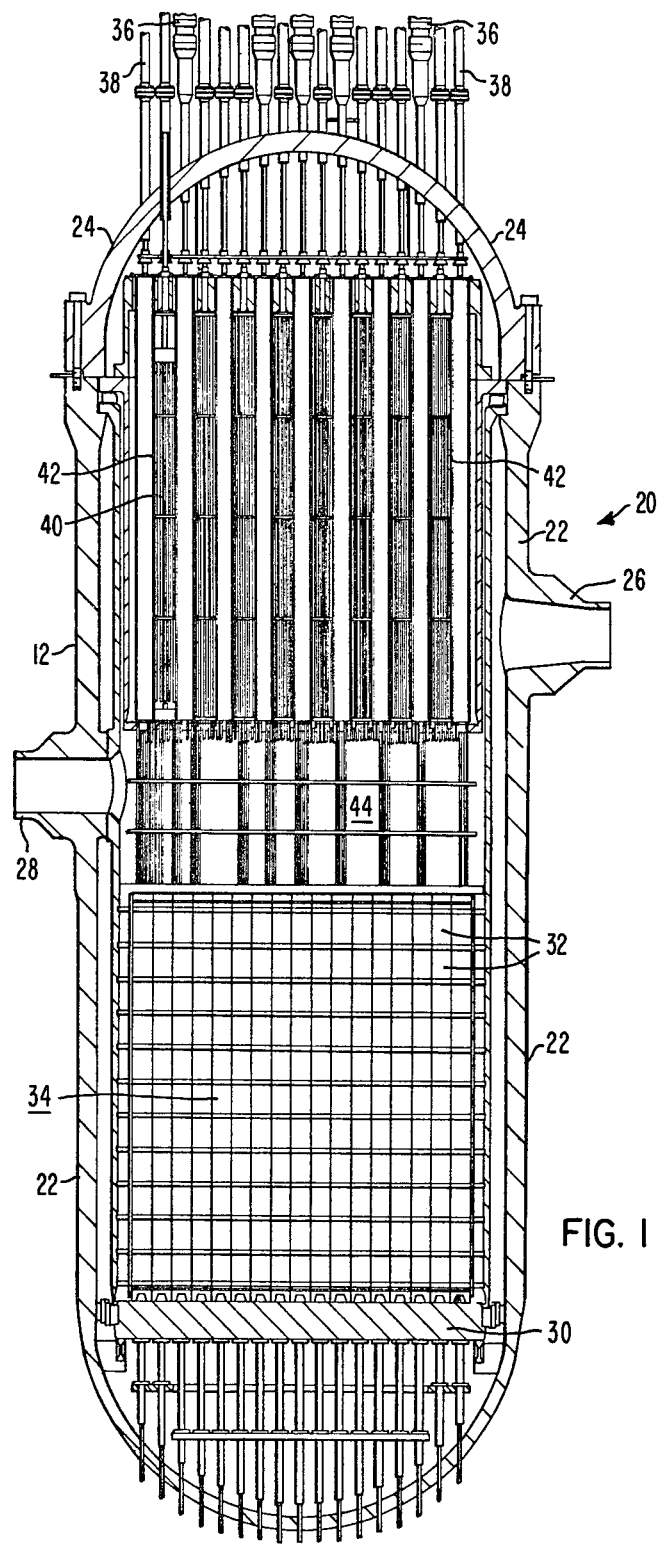
FIG. 1 is a cross-sectional view in elevation of the reactor vessel.

Referring to FIG. 1, the nuclear reactor is referred to generally as 20 and comprises a reactor vessel 22 with a removable closure head 24 attached to the top end thereof. An inlet nozzle 26 and an outlet nozzle 28 are connected to reactor vessel 22 to allow a coolant such as water to circulate through reactor vessel 22. A core plate 30 is disposed in the lower portion of reactor vessel 22 and serves to support fuel assemblies 32. Fuel assemblies 32 are arranged in reactor vessel 22 and comprise reactor core 34. As is well understood in the art, fuel assemblies 32 generate heat by nuclear fissioning of the uranium therein. The reactor coolant flowing through reactor vessel 22 in heat transfer relationship with fuel assemblies 32 transfers the heat from fuel assemblies 32 to electrical generating equipment located remote from nuclear reactor 20. A plurality of control rod drive mechanisms 36 which may be chosen from those well known in the art are disposed on closure head 24 for inserting or withdrawing control rods (not shown) from fuel assemblies 32. In addition, a plurality of displacer rod drive mechanisms 38 are also disposed on closure head 24 for inserting or withdrawing displacer rods 40 from fuel assemblies 32. Displacer rod drive mechanism 38 may be similar to the one described in copending U.S. patent application Ser. No. 217,055, filed herewith in the name of L. Veronesi et al. entitled "Hydraulic Drive Mechanism" and assigned to the Westinghouse Electric Corporation. For purposes of clarity, only a selected number of displacer rods 40 are shown in FIG. 1. However, it should be understood, that the number of displacer rods 40 are chosen to correspond to the number of displacer rod guide tubes in fuel assemblies 32. A plurality of displacer rod guide structures 42 are located in the upper section of reactor vessel 22 with each being in alignment with a displacer rod drive mechanism 38 for guiding the movement of displacer rods 40 through the upper section of reactor vessel 22. A calandria 44 may be arranged between fuel assemblies 34 and displacer rod guide structures 42 and comprises a multiplicity of hollow stainless steel tubes arranged in colinear alignment with each displacer rod and control rod for providing guidance of the displacer rods and control rods through the calandria area and for minimizing flow induced vibrations in the displacer rods and control rods.

Figure 2:
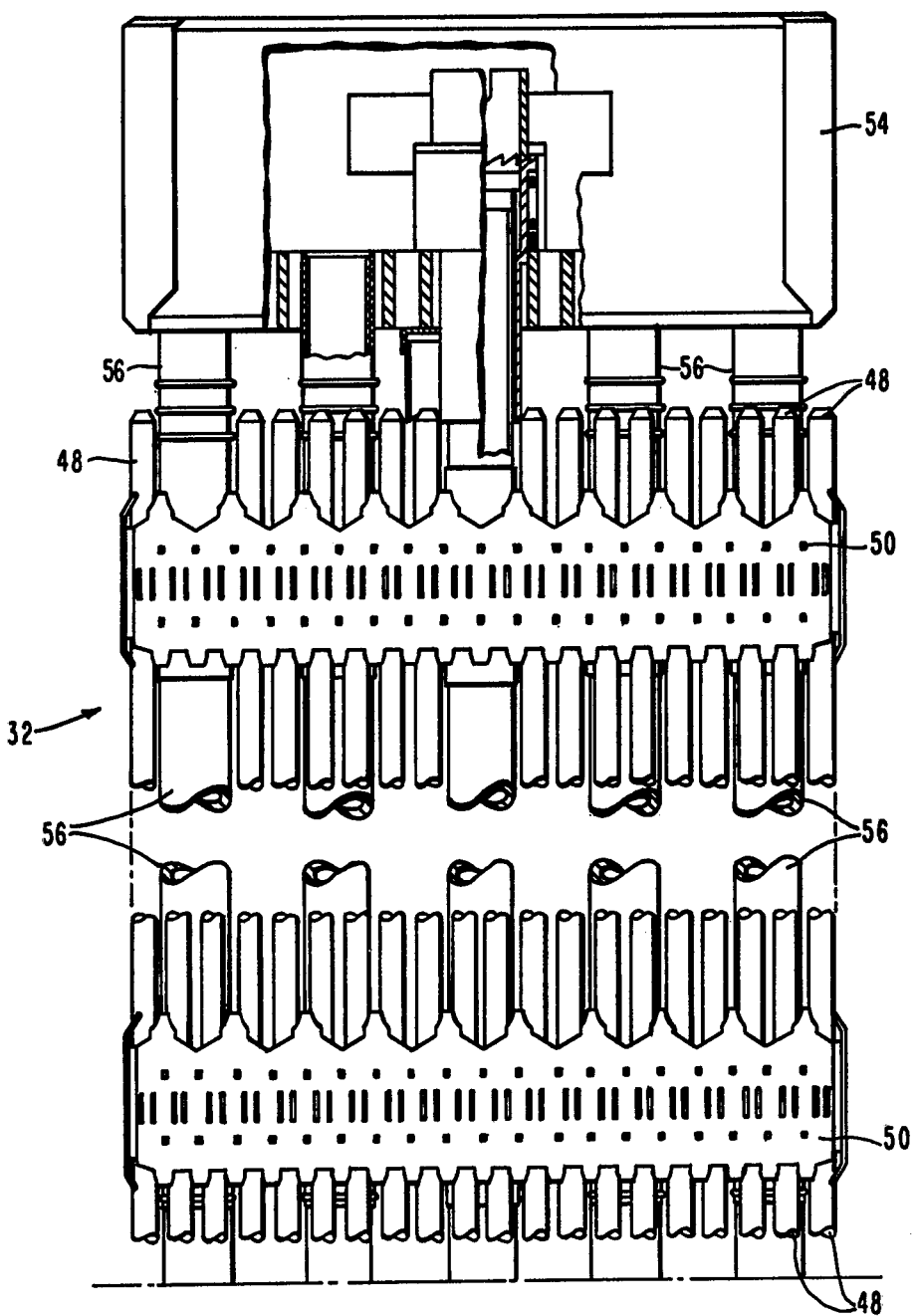
FIG. 2 is a cross-sectional view in elevation of the top portion of the fuel assembly.
Figure 3:
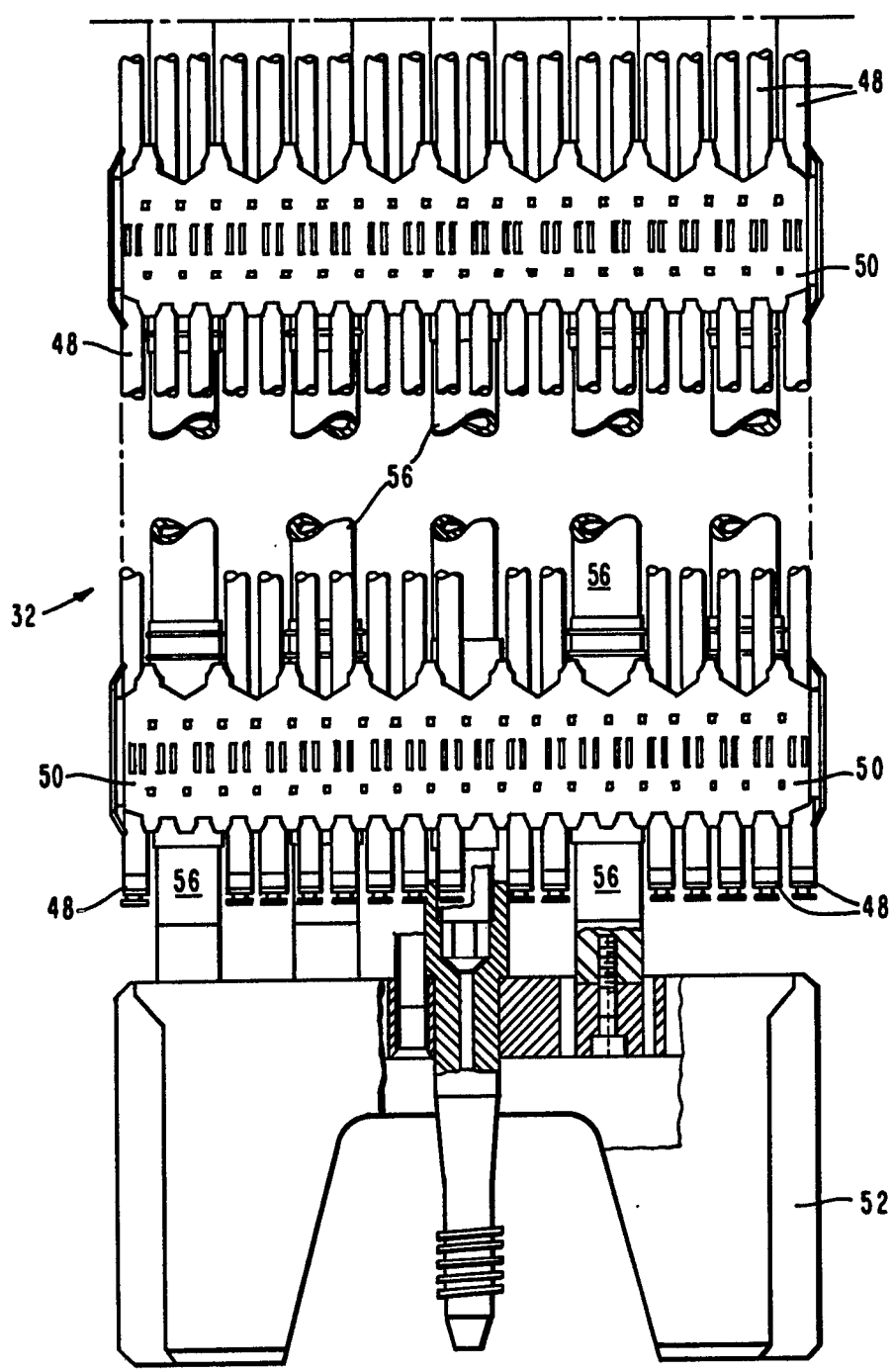
FIG. 3 is a cross-sectional view in elevation of the bottom portion of the fuel assembly.

Referring now to FIGS. 2-4, fuel assemblies 32 comprise fuel elements 48, grids 50, bottom nozzle 52, top nozzle 54, and guide tubes 56. Fuel elements 48 may be elongated cylindrical metallic tubes containing nuclear fuel pellets and having both ends sealed by end plugs. Fuel elements 48 may be arranged in a substantially 20×20 rectangular array and are held in place by grids 50. Guide tubes 56 which may number 25 are arranged in a generally 5×5 array within each fuel assembly 32. Each guide tube 56 occupies the space of about four fuel elements 48 and extend from bottom nozzle 52 to top nozzle 54 and provide a means to support grids 50, top nozzle 54 and bottom nozzle 52. Guide tubes 56 may be hollow cylindrical metallic tubes manufactured from Zircaloy and capable of accommodating rods such as displacer rods 40 or control rods. Displacer rods 40 and control rods are manufactured to be approximately the same size so that each guide tube 56 can equally accommodate either a displacer rod or a control rod. When not occupied by a rod, guide tubes 56 are filled with reactor coolant; however, when displacer rods 40 are inserted in guide tubes 56 displacer rods 40 displace the coolant therein.

Grids 50 are positioned at various locations along the length of fuel assembly 32 and serve to space fuel elements 48 and guide tubes 56 at appropriate distances from each other and to allow the reactor coolant to circulate in heat transfer relationship with fuel elements 48. A more detailed description of a similar grid may be found in U.S. Pat. Nos. 3,379,617 and 3,379,619, both issued in the name of H. N. Andrews et al. As can be seen in FIG. 4, displacer rods 40 are elongated cylindrical substantially hollow rods which can be manufactured out of Zircaloy and may be of the type described in copending U.S. patent application Ser. No. 217,052 entitled "Displacer Rod for Use In A Mechanical Spectral Shift Reactor" filed Dec. 16,1980 in the name of R. K. Gjertsen et al. and assigned to the Westinghouse Electric Corporation. Displacer rods 40 may also contain $ZrO_2$ or $Al_2O_3$ pellets for weighting the rod and enhancing its lowerability. Displacer rods 40 are arranged so as to be in colinear alignment with guide tube 56 so that displacer rods 40 may be inserted in quide tubes 56 when it is desired. Displacer rods 40 are supported from a common attachment known as a spider 58. Spider 58 comprises a body 60 with struts 62 radially extending from body 60. Displacer rods 40 are individually attached to each strut 62 to form an array corresponding to the array of guide tubes 56 into which displacer rods may be inserted. Spider 58 is attached to drive shaft 64 which is connected to displacer rod drive mechanism 38. Activation of displacer rod drive mechanism 38 causes drive shaft 64 to be either lowered or raised thereby inserting or withdrawing displacer rods 40 from fuel assemblies 32 of core 34.

It is important to note that each spider 58 is arranged to be able to insert displacer rods 40 into more than one fuel assembly 32. For example, as shown in FIG. 4, spider 58 is capable of inserting 25 displacer rods in center fuel assembly 32 and 4 displacer rods in each of the adjacent 4 fuel assemblies. In this manner displacer rods 40 can be moved in and out of fuel assemblies 32 without increasing the number of spiders and drive mechanisms.

Figure 5:
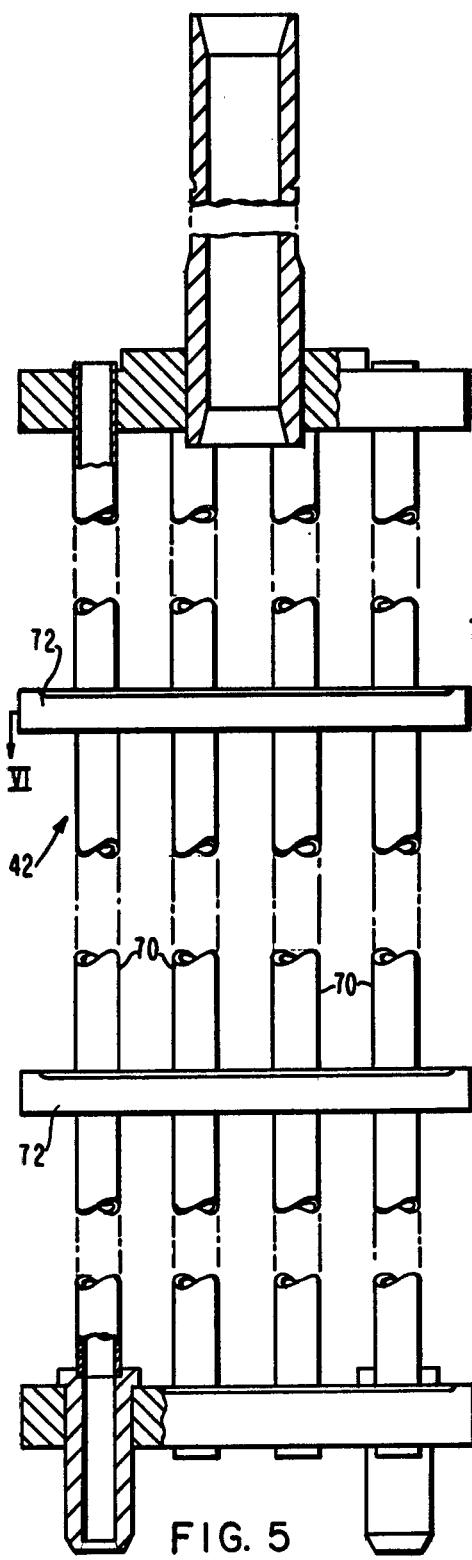
FIG. 5 is a cross-sectional view in elevation of a displacer rod guide structure.
Figure 6:
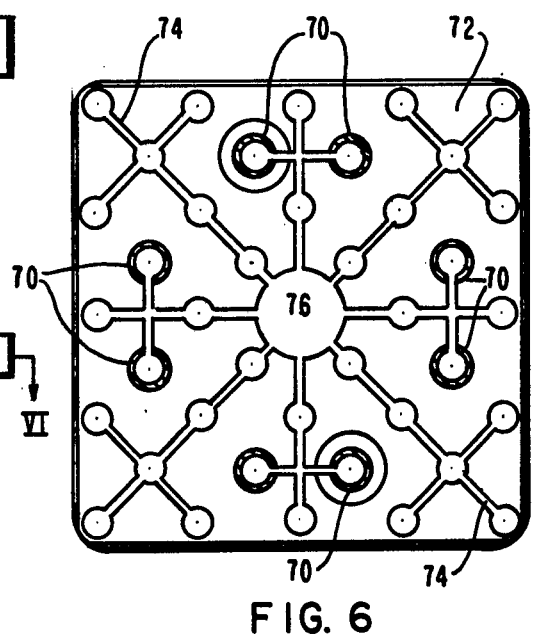
FIG. 6 is a view along line VI—VI of FIG. 5.

Referring now to FIGS. 5 and 6, displacer rod guide structures 42 comprise a plurality of split tube guides 70 which are designed to allow rods such as displacer rods or control rods to pass therethrough. Displacer rod guide structures 42 are located between calandria 44 and closure head 24 as shown in FIG. 1 and are arranged to correspond to each displacer rod drive mechanism 38. A number of spacers 72 are located at various locations along aplit tube guides 70 and together with split tube guides 70 serve to guide displacer rods 40 through the upper section of reactor vessel 22. As can be seen in FIG. 6, 8 split tube guides 70 may be provided for guiding displacer rods 40. The "split" in split tube guides 70 along with slots 74 in spacers 72 allow spider 58 to pass therethrough while maintaining alignment of the rods with guide tubes 56 in fuel assemblies 32. A center slot 76 is also provided for accommodating drive shaft 64 so that spider 58 may be moved therethrough.

Referring again to FIG. 1, calandria 44 which comprises a multiplicity of tubes provides guidance for the rods such as displacer rods 40 through the calandria area. In general, the tubes in calandria 44 are not split tubes, as are split tube guides 70, so that spider 58 stops its descent when spider 58 nears the top of the tubes in calandria 44. When stopped at the top of calandria 44 all rods extend through the calandria tubes and are fully inserted in fuel assembly 32. While inserted in the calandria tubes, the rods are protected from the flow of reactor coolant thereby minimizing vibrations that would otherwise be induced by the high velocity of the reactor coolant in that area.

In the invention as described herein, at least three different types of rods are capable of being inserted into guide tubes 56. For example, displacer rods, control rods, and gray rods may be arranged to be inserted in guide tubes 56. All of the rods are approximately the same size and configuration, but because of the materials with which they are made serve different purposes. Displacer rods 40 which may be either a hollow thick walled tube or may contain a low neutron absorbing material such as $ZrO_2$ or $Al_2O_3$ pellets are used to displace reactor coolant and thereby control reactor moderation. Control rods contain neutron absorbing material as is well understood in the art and serve to control core reactivity in a commonly understood fashion. Gray rods are similar to displacer rods 40 but are made of an intermediate neutron absorbing material such as stainless steel so that their reactivity worth per rod is greater than that of displacer rods 40.

Figure 7:
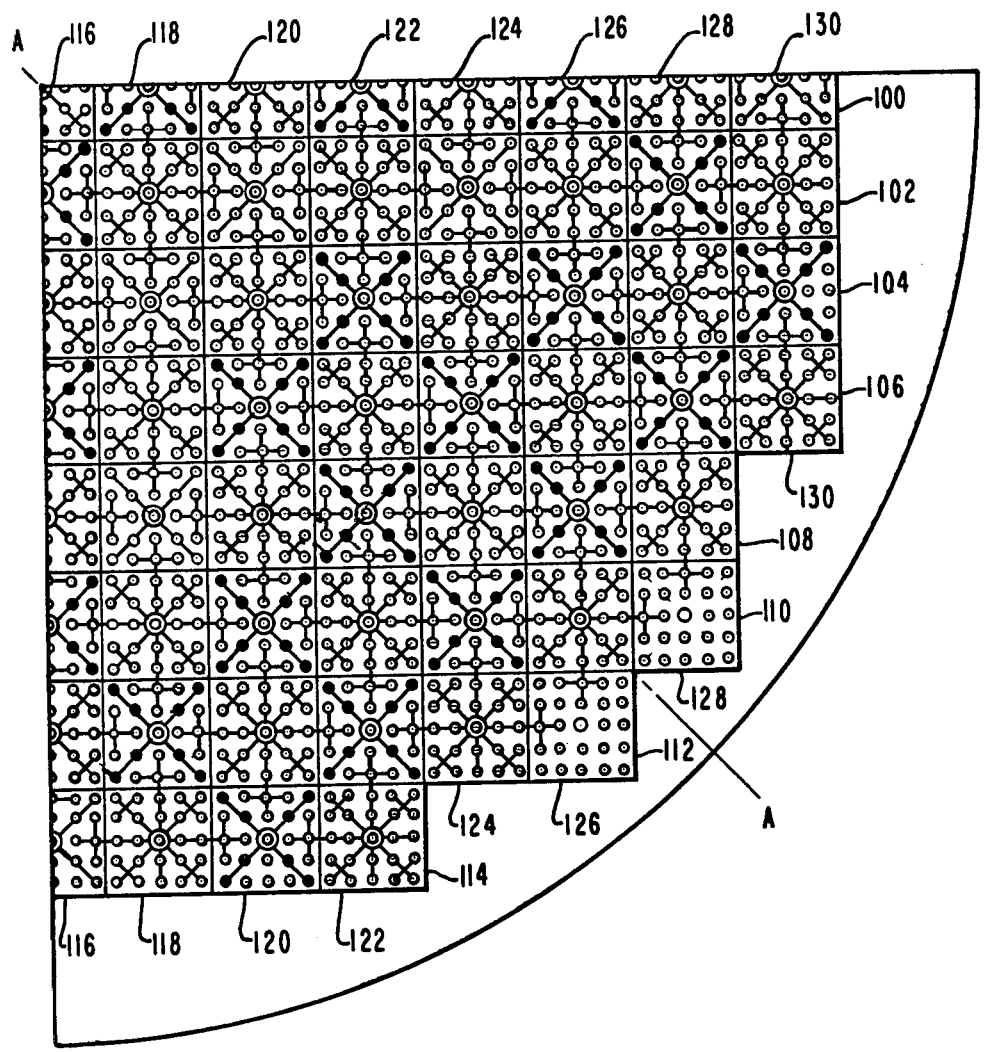
FIG. 7 is a diagram of a quarter core of the reactor.
Figure 8:
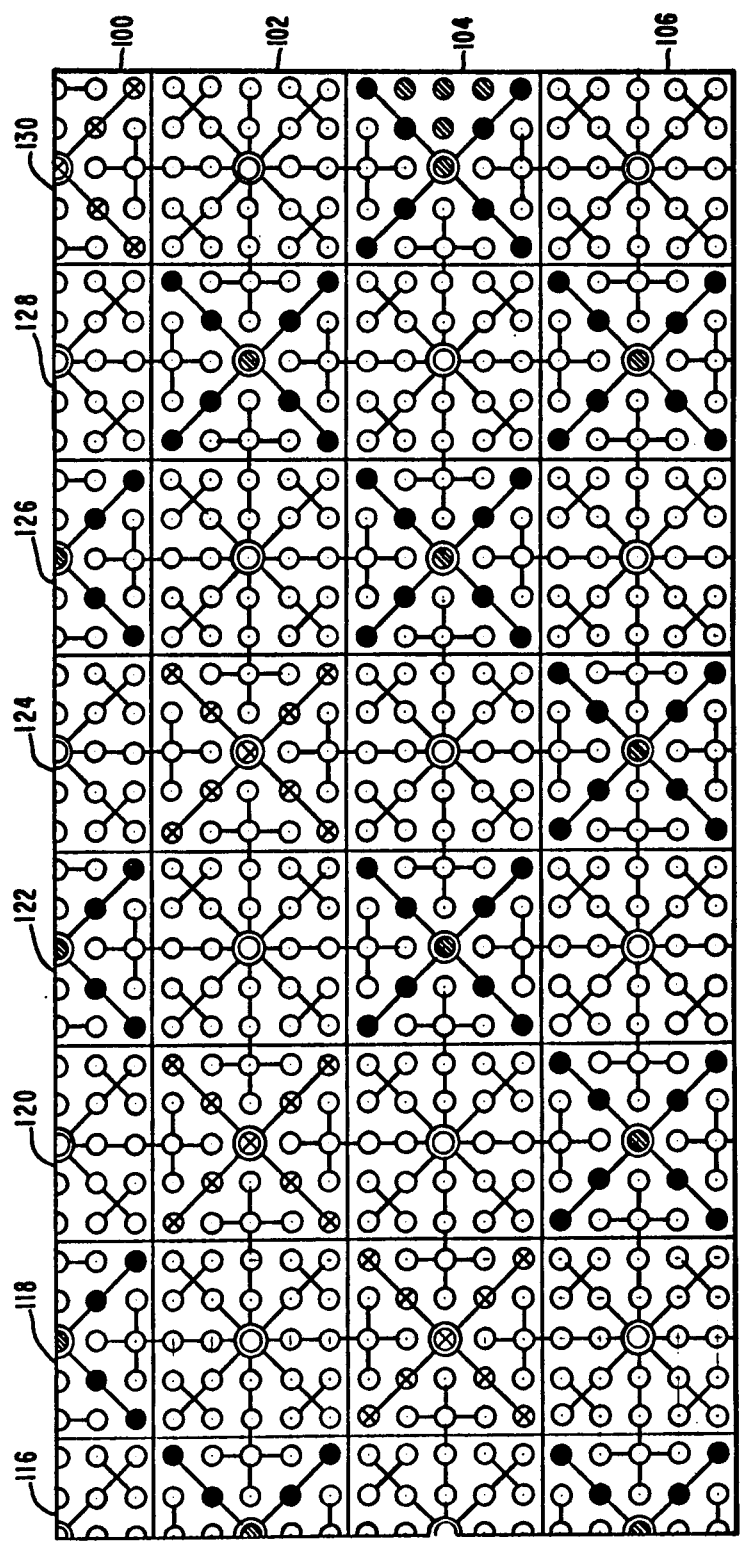
FIG. 8 is an enlarged view of a portion of the quarter core.
Figure 9:
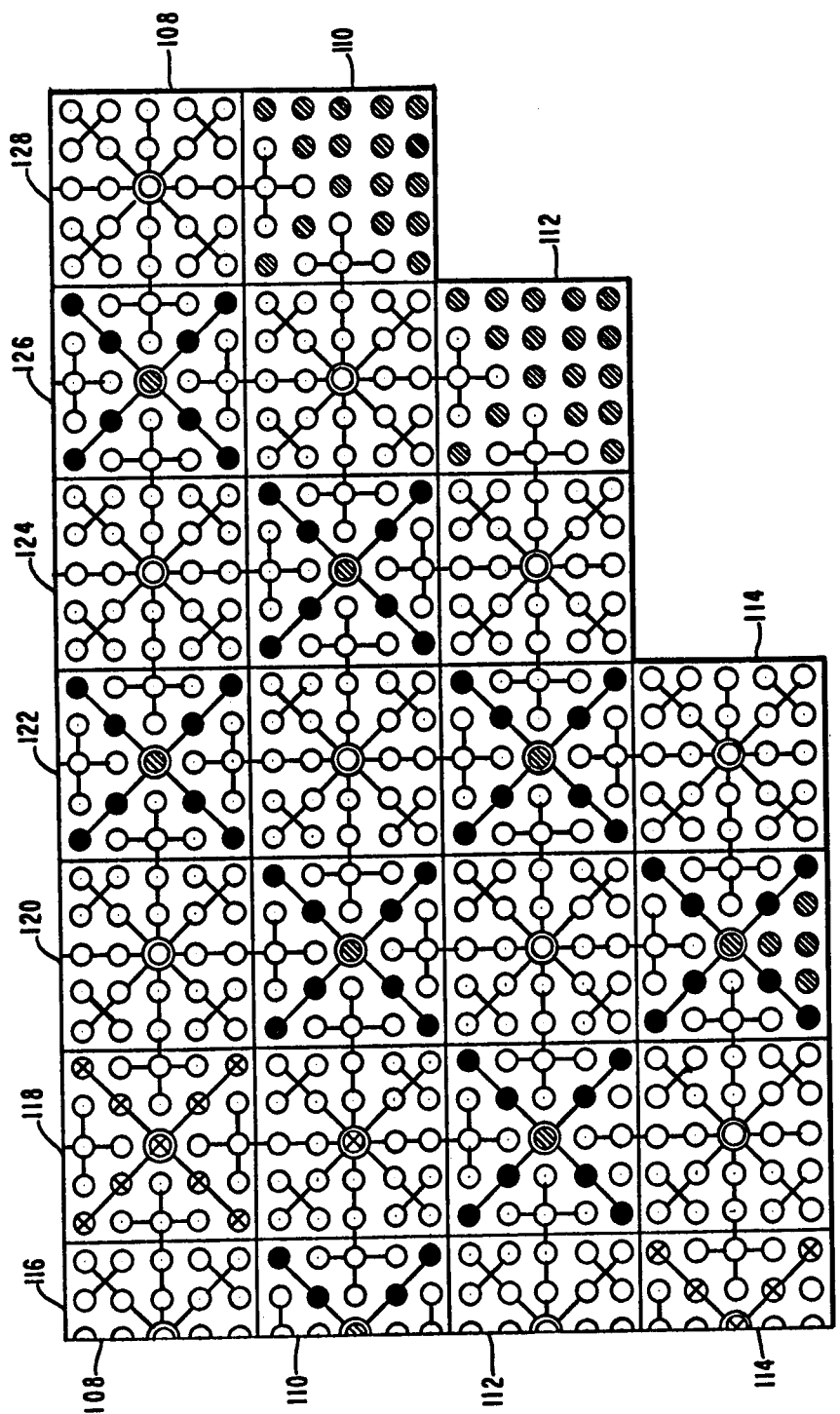
FIG. 9 is an enlarged view of a portion of the quarter core.

Referring now to FIGS. 7-11, the quarter core arrangement of fuel elements 48, displacer rods 40, control rods 80, gray rods 82, and unrodded locations 84 are shown. It is to be understood that the full reactor core configuration can be established by extrapolating the quarter core shown in FIG. 7. Actually, the quarter core shown in FIG. 7 is a mirror image of the eighth core taken along line A—A of FIG. 7. However, the quarter core of FIG. 7 is being shown for clarity.

Figure 10:
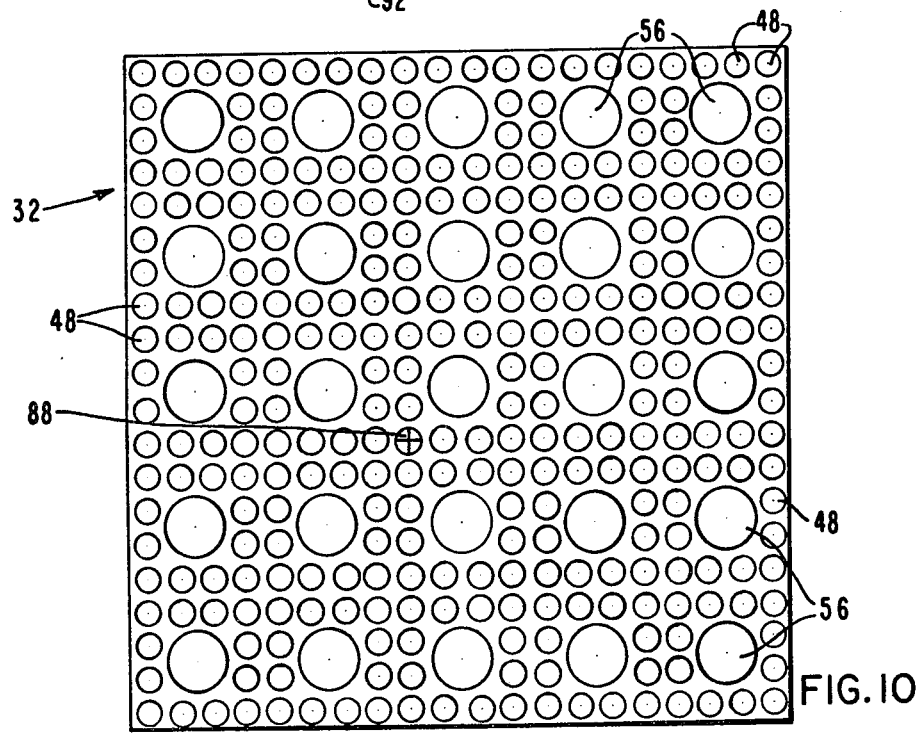
FIG. 10 is cross-sectional diagram of a typical fuel assembly.

As can be seen in FIG. 10, each fuel assembly 32 comprises an array of fuel elements 48 and an array of guide tubes 56. Generally, control rods 38 and gray rods 82 are used only in the diagonally arranged guide tubes 56 while displacer rods 40 are generally used in all guide tubes 56 of a given fuel assembly. In addition, an instrument tube 88 is provided near the center of each fuel assembly 32 for accommodating data intrumentation. While each fuel assembly 32 is essentially identical to the one shown in FIG. 10, each fuel assembly 32 can produce a different function depending on whether guide tubes 56 are occupied by reactor coolant, displacer rods 40, control rods 80, or gray rods 82. Displacer rods 40 and gray rods 82 are generally chosen to be approximately the same size so as to displace approximately the same volume of water. However, gray rods 82 can be thick walled stainless steel cylindrical rods which gives each individual gray rod a higher reactivity worth than a single displacer rod. the wall thickness of the gray rods may be approximately 0.065 inches. But since the gray rods are usually arranged in clusters of 9 as opposed to clusters of 41 displacer rods, each gray rod cluster has a smaller reactivity worth than a displacer rod clusters. Thus, by proper selection of materials and by proper selection of the number of rods, a balanced reactivity worth can be attained for the gray rods and displacer rods. In addition, since the reactivity worth of a gray rod cluster may be approximately 25% of a displacer rod cluster, various combinations of movements of gray rods clusters and displacer rod clusters can yield numerous reactivity worths throughout the core.

Figure 11:
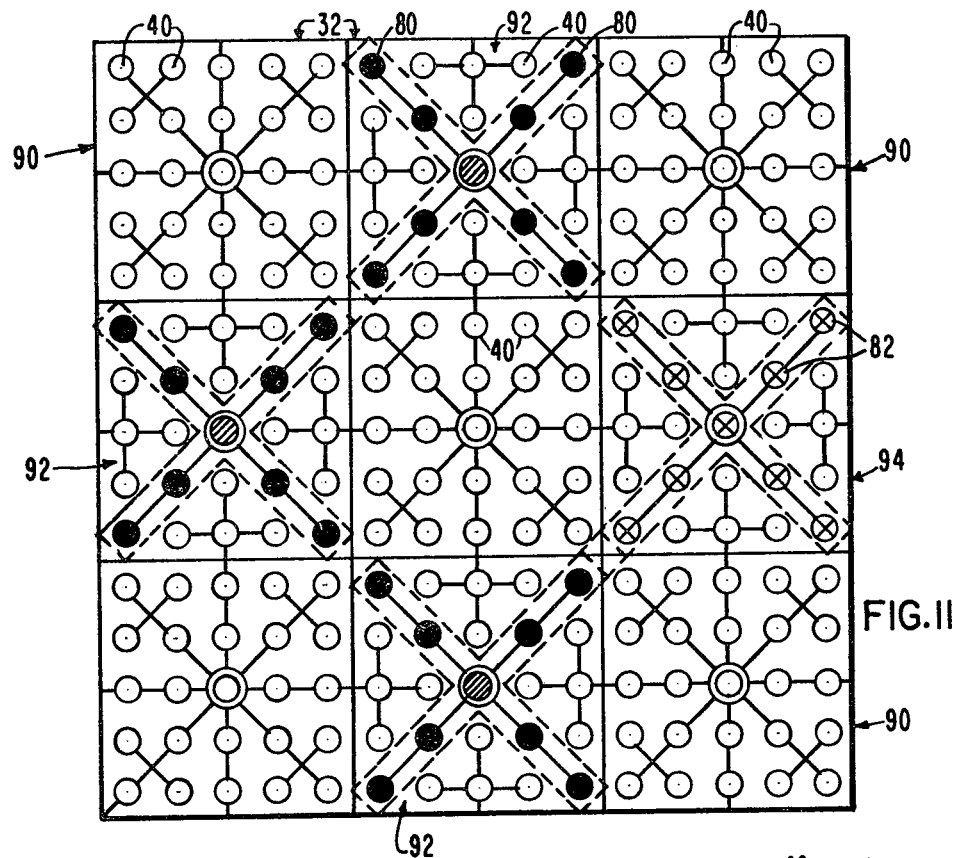
FIG. 11 is a diagram of a section of the core.

Referring now to FIG. 11, a fuel assembly 32 in which no control rods 80 or gray rods 82 are used and in which only displacer rods 40 are used in guide tubes 56 is referred to generally as displacer assembly 90. A fuel assembly 32 in which both displacer rods 40 and control rods 80 are employed (but no gray rods) is referred to as control assembly 92. Similarly, a fuel assembly 32 in which both displacer rods 40 and gray rods 82 are used is called a gray assembly 94. It should be noted that in FIG. 11 fuel elements 48 have been omitted for clarity and that those fuel assemblies are similar to those shown in FIG. 10.

Still referring to FIG. 11, each of the control rods 80 and gray rods 82 are attached to a spider (not shown) similar to spider 58 except that the spider for the control rods 80 or gray rods 82 generally only efffects one fuel assembly. In this manner, all control rods 80 or gray rods 82 in a given fuel assembly can be raised or lowered by a single drive mechanism. Furthermore, since each displacer rod spider 58 can extend into the adjacent fuel assemblies (as illustrated in the center portion of FIG. 11 and in FIG. 4), the displacer rod spider's 58 movement effects the control on five fuel assemblies and reduces the number of displacer rod drive mechanisms needed. Of course, on the periphery of the quarter core (as shown in FIG. 7) the particular spiders may move less than the usual number of rods because there are no adjacent fuel assemblies or there are unrodded locations 84.

Referring again to FIGS. 8 and 9 which comprise FIG. 7, a quarter core arrangement. Each row or partial row is numbered 100–114 and each column or partial column 116–130 and comprises:

| Fuel Assembly | |
|---|---|
| (100,116) | quarter displacer assembly |
| (100,118) | half control assembly |
| (100,120) | half displacer assembly |
| (100,122) | half control assembly |
| (100,124) | half displacer assembly |
| (100,126) | half control assembly |
| (100,128) | half displacer assembly |
| (100,130) | half gray assembly |
| (102,116) | half control assembly |
| (102,118) | full displacer assembly |
| (102,120) | full gray assembly |
| (102,122) | full displacer assembly |
| (102,124) | full gray assembly |
| (102,126) | full displacer assembly |
| (102,128) | full control assembly |
| (102,130) | full displacer assembly |
| (104,116) | half displacer assembly |
| (104,118) | full gray assembly |
| (104,120) | full displacer assembly |
| (104,122) | full control assembly |
| (104,124) | full displacer assembly |
| (104,126) | full control assembly |
| (104,128) | full displacer assembly |
| (104,130) | partial control-unrodded assembly |
| (106,116) | half control assembly |
| (106,118) | full displacer assembly |
| (106,120) | full control assembly |
| (106,122) | full displacer assembly |
| (106,124) | full control assembly |
| (106,126) | full displacer assembly |
| (106,128) | full control assembly |
| (106,130) | full displacer assembly |

-continued

| Fuel Assembly | |
|---|---|
| (108,116) | half displacer assembly |
| (108,118) | full gray assembly |
| (108,120) | full displacer assembly |
| (108,122) | full control assembly |
| (108,124) | full displacer assembly |
| (108,126) | full control assembly |
| (108,128) | full displacer assembly |
| (110,116) | half control assembly |
| (110,118) | full displacer assembly |
| (110,120) | full control assembly |
| (110,122) | full displacer assembly |
| (110,124) | full control assembly |
| (110,126) | full displacer assembly |
| (110,128) | partial displacer unrodded assembly |
| (112,116) | half displacer assembly |
| (112,118) | full control assembly |
| (112,120) | full displacer assembly |
| (112,122) | full control assembly |
| (112,124) | full displacer assembly |
| (112,126) | partial displacer unrodded assembly |
| (114,116) | half gray assembly |
| (114,118) | full displacer assembly |
| (114,120) | partial control unrodded assembly |
| (114,122) | full displacer assembly |

As can be seen from the above description of the quarter core, the core configuration based on this concept can be illustrated generally as shown in FIG. 11. Basically, the fuel assembly in the center of the full core as represented by fuel assembly (100,116) in FIG. 7 can be chosen to be either a control assembly 92 or preferably a displacer assembly 909. Once this is chosen, the four fuel assemblies immediately adjacent to the flat sides of the center fuel assembly are chosen to be the other type and the fuel assemblies on the diagonal are chosen to be the same type as the center assembly. This pattern is then continued in an alternating fashion. For example, the center fuel assembly (100,116) in FIG. 7 was chosen to be a displacer assembly 90 so that the fuel assemblies on its adjacent flat sides are chosen to be either control assemblies 92 or gray assemblies 94 while those on the diagonal are chosen to be displacer assemblies 90. This pattern is repeated in alternating fashion until the periphery of the core is reached where the end fuel assemblies may be chosen to be hybrid assemblies based on the nuclear physics of the particular core. Whether a particular assembly is chosen to be a control assembly 92 or a gray assembly 94 is determined by first selecting the number and location of control assemblies needed based on conventional core design. The remainder of the assemblies not chosen to be control assemblies 92 are then used as gray assemblies 94. Thus, substantially the entire core can be arranged on an alternating pattern of displacer assemblies and control or gray assemblies with practically all the fuel assemblies being served by at least one displacer rod spider 58 and with each displacer rod spider 58 serving generally 5 fuel assemblies. Moreover, each fuel assembly is served by at least one drive mechanism for either displacer rods, control rods or gray rods.

The illustrated core arrangement provides a means by which the neutron spectrum can be controlled in a "spectral shift" fashion by controlling the moderator volume in the core. This can be accomplished by displacing and replacing the water coolant in the core at appropriate times thereby changing the moderation of the core. In the present invention, displacer rods 40 and gray rods 82 can be used to effect this moderation change.

In operation, all displacer rods 40 and gray rods 82 are inserted in core 34 at the beginning of the core life. However, none of the control rods 80 need be inserted at that time. The insertion of displacer rods 40 and gray rod 82 is done by activating the appropriate drive mechanism such as displacer rod drive mechanism 38. when the driven mechanism is activated, displacer rods 40 and gray rods 82 fall into the appropriate guide tubes 56 in fuel assemblies 32. The displacer rods and gray rods will displace their volume of coolant (water) thus reducing the volume of moderator in core 34. The reduction of moderator hardens the neutron spectrum of the core and increases plutonium production. This hardening of the neutron spectrum is generally referred to as "spectral shift". The harder neutron spectrum reduces boron chemical shim requirements, results in a more negative moderator temperature coefficient, and reduces or eliminates burnable poison requirements. As the uranium fuel in the core is depleted over the life of the core, a certain number of displacer rods 40 and/or gray rods 82 may be withdrawn from the core by activating their respective drive mechanisms. The withdrawal of the rods allows more water-moderator into the core region and increases moderation of the core. This, in effect, introduces reactivity worth at a time when fuel depletion is causing a reactivity worth depletion. Thus, the reactivity of the core can be maintained at appropriate levels for a longer time. The withdrawal of the rods can continue at a selective rate (depending on core conditions) until, near the end of core life, all displacer rods 40 have been withdrawn from the core.

In addition to the use of displacer rods 40 and gray rods 82 for the purpose of "spectral shift", these rods can also be used for load follow purposes. For example, when the concentration of boron in the reactor coolant falls below approximately 100 ppm the capability of a boron bleed-and-feed operation to compensate for the xenon transient during load follow may not be practical. However, by withdrawing or inserting selected displacer rods 40 or gray rods 82, a proper reactivity change can be made to compensate for the xenon transient. Moreover, such a maneuver can be performed to adjust overall power requirements or to adjust radial power distributions. Since gray rods 82 have a different reactivity worth than displacer rods 40 and since gray rods 82 and displacer rods 40 are located in different core locations, proper selection and movement of the rods can accomplish delicate reactor control.

Calculations of the reactivity worth of a 41-rod displacer rod cluster indicates that such a cluster may have a reactivity worth of approximately 75 pcm. That is, core reactivity is expected to increase by about 75 pcm when a single 41-rod displacer rod cluster is moved from fully inserted to fully withdrawn when fuel burnup is about 11,000 MWD/MTU. At the same time, the moderator temperature coefficient of reactivity is predicted to be about $-35$ pcm/°F. Hence, withdrawl of a single 41-rod displacer rod cluster, with no associated change in control rod position or power level, will result in a reactor coolant average temperature increase of about 2° F. with the temperature change lagging behind displacer rod movement by about 10–20 seconds (one loop transit time). Since the coolant average temperature changes in response to displacer movement are small and occur slowly, coolant temperature change can be used to "cushion" the effect of displacer movement on overall core reactivity. That is, due to the negative moderator temperature coefficient, the reactor coolant temperature change will tend to offset a portion of the reactivity change caused by the displacer rod movement thus providing a smooth transition in core reactivity when a displacer rod cluster is moved. Since displacer rod cluster reactivity worth and the absolute value of the moderator temperature coefficient change in the same direction and at comparable fractional rates with changing boron concentration and hydrogen-to-uranium ratio in the core, the temperature change per unit displacer rod cluster movement is generally independent of core conditions throughout the latter part of the core life.

Figure 12:
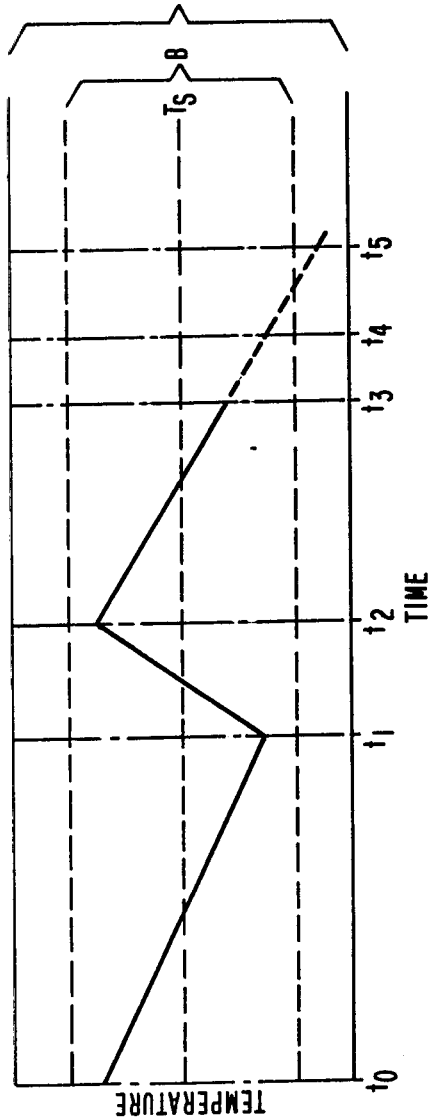
FIG. 12 is a diagram of a reactor load follow response.

Referring to FIG. 12, utilizing these concepts for reactor control two reactor coolant temperature bands can be selected for reactor operating purposes. These bands may be different from and wider than the conventional operating bands. One band, band A, is the wide band and is selected to be approximately 4° F. wide, 2° F. on either side of the reactor coolant average temperature set point, $T_s$. $T_s$ is chosen to be the reactor coolant average temperature at which it is desired to operate the reactor. As an alternative, the average cold leg temperature may be used. An administrative guidance limit or narrow band, band B, may be chosen to be approximately 3° F. wide, 1.5° F. on either side of set point temperature $T_s$. Band A is chosen so that if the reactor coolant temperature reaches this limit automatic systems are initiated to reverse the temperature drift. Band B is chosen as a working guide limit so that as the reactor coolant temperature approaches this limit either operator or automatic selection and initiation of displacer rod movement may begin to avoid reaching the band A limit. In this manner as the reactor coolant temperature drifts downwardly such as during xenon accumulation as illustrated between $t_0$ and $t_1$, withdrawal of a particular displacer or gray rod cluster is initiated. Between $t_1$ and $t_2$ the cluster is withdrawn which takes approximately 15 minutes to achieve complete withdrawal. The withdrawal of a cluster allows additional water-moderator to enter the core which increases core reactivity and results in the reactor coolant temperature drifting upwardly. As the xenon continues to accumulate the coolant temperature begins to drop again as illustrated between $t_2$ and $t_3$. As $t_3$ is approached it again becomes necessary to select and withdraw the next cluster, either a 41 rod displacer cluster or a 9 rod gray cluster depending on the reactivity addition needed. The time frame between $t_4$ and $t_5$ indicates the time frame in which the next cluster should begin to be withdrawn to avoid reaching band A's limit. In this manner reactor coolant temperature variations such as those due to xenon transients can be compensated for without adjusting the boron concentration in the coolant and while prolonging the core life.

In addition to determining when a particular cluster should be moved, it is also necessary to determine which cluster or group of clusters should be moved and whether they should be moved in or out of the core. In this regard it can be appreciated that since a displacer rod cluster effects a larger core area than does a gray rod cluster and since individual gray rods have a different reactivity worth than do individual displacer rods, a proper selection and movement of various clusters can effect core reactivity levels and radial power distribution.

Figure 13:
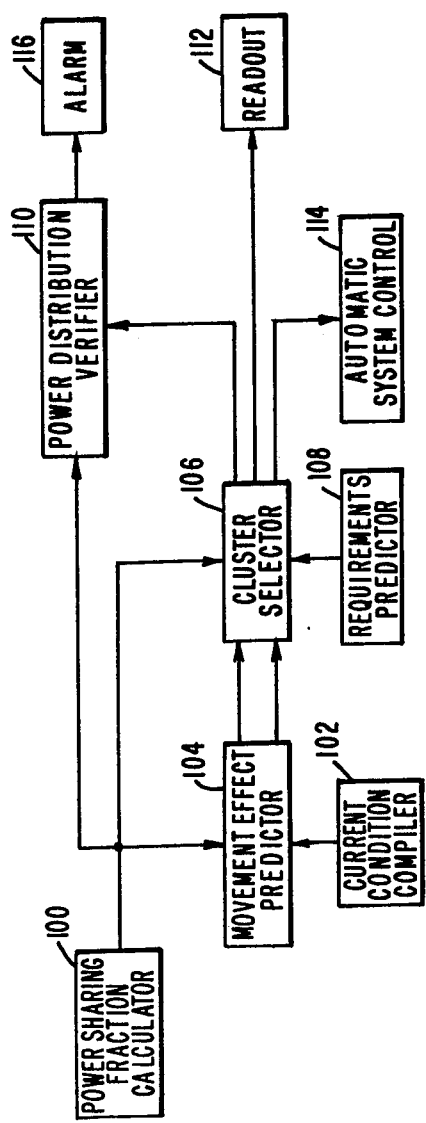
FIG. 13 is a flow chart of rod cluster selection logic.

Referring now to FIG. 13, a power sharing fraction calculator 100 determines the fraction of the total core power that is attributed to each fuel assembly. This can be ascertained in conventional manner by having a sufficient number of in-core radiation detectors to determine local neutron flux or nuclear power level magnitudes. For example, about 60 fuel assemblies may be equipped with about 5 radiation detectors such as gamma detectors. The 5 radiation detectors can be axially spaced along the fuel assembly so that in all about 300 in core detectors can provide instantaneous reactivity levels for 60 core zones. These readings, together with calibration and weighting factors, can be fed to power sharing fraction calculator 100 for determining the power sharing fraction borne by each core zone. At the same time, current condition compiler 102 compiles other core conditions such as boron concentration, hydrogen-to-uranium fraction, and present cluster positions. This information together with the information from power sharing fraction calculator 100 is transmitted to displacer movement effect predictor 104 which determines the reactivity change and power sharing fraction change that would occur by moving each cluster. It has been found that the reactivity change associated with a particular fuel assembly by moving the corresponding cluster is related to the present fuel assembly power density. The correlation can be expressed as follows:

$$\Delta R = m \times APD$$

where
$\Delta R$ = reactivity change of the fuel assembly by inserting or withdrawing the corresponding cluster (displacer rods or gray rods);
APD = fuel assembly power density before moving the cluster; and
m = straight line slope
It has also been determined that the slope, m, can be related to burnup as illustrated by the following data:

| Burnup (MWD/MTU) | Slope, m (pcm per cluster/unit power density) |
| --- | --- |
| 1,000 | 5.4 |
| 6,000 | 32.8 |
| 11,000 | 60.0 | yielding a relation of slope to burnup of:

$$m = 0.0054 \times BU$$

where BU = burnup in MWD/MTU. Therefore, $$\Delta R = 0.0054 \times BU \times APD$$

By using this relationship, movement effect predictor 104 can predict the reactivity change to be expected from moving the cluster corresponding to that fuel assembly. This information is then transmitted to cluster selector 106.

It has also been found that the post-withdrawal power density of a particular fuel assembly can be related as follows:

$$NPD = (1.17 + 0.000033 \times BU) \times OPD$$

where
NPD = new fuel assembly power density
OPD = old fuel assembly power density
BU = burnup in MWD/MTU
Thus the power density change in a particular fuel assembly can be found based on its power density prior to cluster movement. This information is then transmitted to cluster selector 106.

A requirements predictor 108 which may be chosen from those well known in the art is arranged to determine and transmit to cluster selector 106 the amount of reactivity increase or decrease that is anticipated to be needed. This can be based on data such as coolant average temperature, power level, band limits, and set point considerations. Power sharing fraction calculator also feeds the power sharing fraction for each fuel assembly to cluster selector 106.

Cluster selector 106 accepts the power sharing fraction for each fuel assembly prior to a cluster movement, the reactivity change to be expected if a cluster were moved, the present fuel assembly power density (OPD) for each fuel assembly, the predicted fuel assembly power density (NPD) for each fuel assembly, and the reactivity change required. From this, a new power sharing fraction for each fuel assembly can be determined. Based on this information and the current position of each cluster, cluster selector 106 can select the one or more grouping of cluster movements that will achieve the desired reactivity change without distorting the overall power sharing profile. In general, this search may include predicting the next reactivity change and the movement required thereby so as to prevent making a cluster movement that could hinder latter cluster movements. The selected cluster groupings can be transmitted directly to power distribution verifier 110, operator readout 112, and automatic system control 114. Power distribution verifier can check the predicted power sharing fractions to the old power sharing fractions and can trip alarm 116 if the predicted change is outside set limits. The operator can view operator readout 112 and select which of the selected cluster groupings to use or the selection can be made automatically by cluster selector 106 and transmitted to automatic system control 114 for implementation of the cluster movement. Thus, based on these criteria, various movements (insertions or withdrawals) of numerous combinations of available displacer rod or gray rod clusters can be evaluated and implemented for controlling a pressurized water reactor such as during load follow.

Therefore, the invention provides a method of operating a pressurized water nuclear reactor in which the reactor power level can be changed without making control rod or chemical shim changes.

I claim as my invention:

1. A method of operating a nuclear reactor comprising:
   determining the current power density of each core zone;
   predicting the anticipated reactivity change of each of said core zones after movement of the corresponding reactor coolant displacer elements, based on the equation $$\Delta R = K \times BU \times APD$$

where
$\Delta R$ = reactivity change of the core zone resulting from the movement of the corresponding displacer element;
APD = core zone power density before movement of the corresponding displacer element;
BU = burnup in MWD/MTU; and
K = a constant;

determining the reactivity change needed to achieve the desired reactor core power level;

selecting an appropriate displacer element for movement to attain the desired reactivity change; and moving said selected displacer element relative to said core for attaining the desired reactor core power level.

2. The method according to claim 1 wherein said method further comprises:

determining the fraction of the total core power that is attributed to each of said core zones;

predicting the anticipated fraction of the total core power that would be attributed to each of said core zones after movement of the corresponding reactor coolant displacer element; and selecting said appropriate displacer element for movement to attain the desired reactivity change without disturbing the total core power distribution.

3. The method according to claim 2 wherein said step of predicting the anticipated fraction of the total core power that would be attributed to each of said core zones after movement of the corresponding displacer element comprises predicting said fraction where:

$$NPD = (a + b \times BU) \times OPD$$

and where:

NPD = core zone power density after displacer element movement;

OPD = core zone power density prior to displacer element movement;

BU = burnup in MWD/MTU;

a = a constant; and b = a constant.

4. The method according to claim 3 wherein said method further comprises prior to moving said selected displacer element, selecting the next appropriate displacer element for movement and determining that said selected appropriate displacer element movement would not preclude moving said next appropriate displacer element.

5. The method according to claim 4 wherein K = 0.0054.

6. The method according to claim 5 wherein a = 1.17 and b = 0.00033.

* * * * *